United States Patent [19]

McBride

[11] 4,338,886
[45] Jul. 13, 1982

[54] PREDATOR CONTROL TOXIC COLLAR

[76] Inventor: Roy T. McBride, P.O. Box 725, Alpine, Tex. 79830

[21] Appl. No.: 221,819

[22] Filed: Dec. 31, 1980

[51] Int. Cl.³ .................... A01K 27/00; A01K 29/00
[52] U.S. Cl. .................................... 119/106; 119/156
[58] Field of Search .............................. 119/106, 156

[56] References Cited

U.S. PATENT DOCUMENTS

| 1,349,665 | 8/1920 | Duncombe | 119/106 |
| 2,989,030 | 6/1961 | Draheim | 119/106 |
| 3,842,806 | 10/1974 | McBride | 119/106 |
| 3,935,839 | 2/1976 | Goodwin | 119/156 |

Primary Examiner—Hugh R. Chamblee
Attorney, Agent, or Firm—Richards, Harris & Medlock

[57] ABSTRACT

A predator control collar (10) includes a pair of toxic filled pouches (12) and (14) attached to elastic straps (16) and (18) for expansion. The pouches (12) and (14) include a fill plug (22) for a needle to inject a liquid predicide into the pouches. The pouches (12) and (14) are positioned about the elastic straps (16) and (18) so that they are maintained in the general region below the ear of the livestock, and the straps (16) and (18) are of sufficient elasticity to expand with the increase in the size of the animal's neck as it grows to full maturity.

15 Claims, 4 Drawing Figures

PREDATOR CONTROL TOXIC COLLAR

TECHNICAL FIELD

This invention relates to a livestock collar having a toxicant filled pouch located about the neck region of a livestock to repel or destroy a predator when the toxicant is released when the pouch is punctured, and more particularly to an expandable livestock collar to be worn during the life of the lifestock.

BACKGROUND ART

Domestic farm animals, such as cattle, sheep, and goats, are raised on ranches under conditions which make them susceptible to attack and destruction by their natural predators. In particular, sheep and goat herds of the United States remain subject to attack from coyotes, while in Africa sheep and goat herds are subject to attack by jackals. The destruction of livestock by predators presents ranchers with serious financial problems and sheep and goat ranchers expend considerable time and money in trying to reduce and eliminate their losses from such attacks.

There are a number of predator control programs which have been attempted by individual ranchers and government agencies to reduce or eliminate predator attacks. Some of these methods include use of poison bait, traps, snairs and shooting, including shooting from planes and helicopters. Such conventional predator control techniques are not selective in killing the predator responsible for attacking a rancher's livestock, but indiscriminately kill members of the predator species responsible for livestock attacks as well as innocent members of the species. The indiscriminate slaughter from wildlife predator control programs results in a loss of wildlife that many consider unacceptable to the environment. In addition, many of these predator control programs are expensive and often not very cost effective in eliminating the predator responsible for attacks on a herd.

In response to such indiscriminate predator control programs which were often ineffective despite destruction of a number of predators, attempts have been made to reduce or eliminate predator attacks on livestock by killing or repelling only the targeted predator responsible for the attacks. One such early attempt is disclosed in U.S. Pat. No. 1,349,665 in the use of mechanical injectors suspended from a sheep's neck to kill coyotes. Such mechanical injectors can be accidently triggered to release their toxic chemical on contact with another sheep or some undergrowth or brush. Another more recent development of a passive predator control technique is disclosed in the inventor's earlier U.S. Pat. No. 3,842,806, which discloses a toxicant filled reservoir enclosed in a outer covering resembling the color and texture of the natural surface of the sheep. Such collars have to be frequently replaced as the sheep grows, and the time required to round up these livestock and replace collars makes it impractical and expensive to use them on an entire herd of sheep. Further, these collars used straps and buckles, which could come loose and fall off. A need has thus risen for an approved predator control collar which may be placed upon livestock, such as a young lamb or kid goat and remain in place without further maintenance during the life of the animal.

DISCLOSURE OF THE INVENTION

A pair of toxicant filled pouches are affixed to an expandable livestock collar to maintain the toxicant in the neck region of the livestock to kill or repel a predator puncturing the pouch during an attack. The pouches may be affixed to the collar in such a manner to maintain them in the general region below the ear of the sheep where a coyote frequently attacks in killing a sheep. The expandable toxic collar may be placed upon lambs and kid goats at the same they are gathered for their vaccinations, approximately one month after birth. Collars may be fitted with the tags positioned under each ear, and the tags will remain in place during the entire time the livestock is exposed to predator attacks. The collar may expand as the sheep's neck grows and still maintain the toxic pouch in the same general position. The toxic collar may be removed when the livestock is ready to market.

Another advantage of the improved toxic collar of the present invention is the elimination of the necessity of applying a toxic collar only to a target sheep which requires the removal of other sheep or goats from the area where predator attacks are occurring. Toxic collar of the present invention may be applied to all sheep and does not require the gathering in of target animals to replace a collar because the lamb or kid has grown in size.

BRIEF DESCRIPTION OF DRAWINGS

For a more complete understanding of the present invention and further advantages thereof, reference is now made of the following description taken into conjunction with the following drawings.

DESCRIPTION OF THE PREFERRED EMBODIMENT

Figure 1:
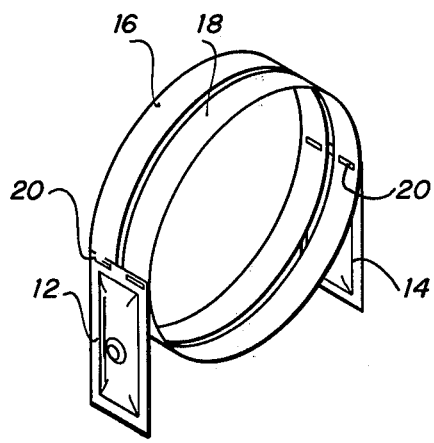
FIG. 1 is a perspective view of a predator control toxic collar of the present invention.

FIG. 1 illustrates a predator control collar of the present invention, generally identified by the reference numeral 10. A pair of toxicant pouches 12 and 14 are attached to a pair of elastic straps 16 and 18. The number of elastic straps may vary. The pouches 12 and 14 are secured to the straps 16 and 18 by metallic fasteners 20 passing through the upper portion pouches 12 and 14 but not in the chamber containing the toxic agent. The pouches 12 and 14 are secured at a point about the circumference of the closed elastic loops 16 and 18 so that the pouches 12 and 14 will be located just beneath the ear of the sheep when the toxic collar 10 is placed upon the neck of the protective livestock. Of course, the pouches 12 and 14 may be located anywhere in the neck region of the livestock where the predator attacks the livestock.

Figure 2:
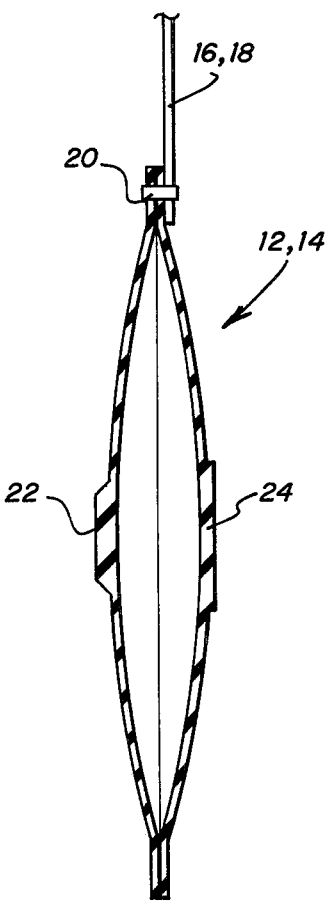
FIG. 2 is a cross-sectional side view of the toxic tag of the present invention.

As illustrated in FIG. 2, the pouches 12 and 14 are closed vessels for containing the toxic substance to kill or repel a coyote or other predator. The toxic agent used may be selected on the basis of its effectiveness in killing or repelling the predator and for its minimal detrimental impact to the environment. The toxic agent chemically known as Sodium Fluoracetate (Compound 1080) has proven to be an effective predicide for coyotes attacking sheep and goats in the southwestern part of the United States, and it is believed to have minimal detrimental impact to the environment. Of course, any predicide may be used which is both effective and environmentally safe.

The pouches 12 and 14 may be constructed of rubber or polyvinylchloride to form a leakproof vessel to retain the predicide within the vessel until it is ruptured or punctured by a predator. A liquid predicide has been found to be most effective and may be implied by the needle inserted into a fill plug 22 on one side of the pouch. A reinforced wall section 24 may be located on the side of the pouch 12 or 14 opposite the plug 22 to prevent the needle from puncturing the other side of the vessel. Of course, any other suitable method may be used for filling the pouches 12 and 14, such as a valve or resealable cover.

Figure 3:
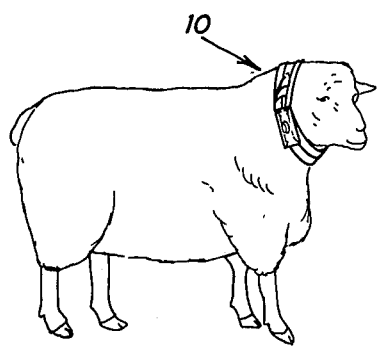
FIG. 3 is a perspective view of a toxic control collar of the present invention positioned on a sheep.

FIG. 3 illustrates an adult sheep with a predator control collar 10 in position. The elastic straps 16 and 18 enable the collar 10 to be placed on the young lamb or kid shortly after birth and maintains the collar in proper position. The straps 16 and 18 expand as the neck of the young sheep expands, while still maintaining the toxic pouches 12 and 14 in the position shown slightly below the ear of the sheep. In the preferred embodiment, the toxic pouches 12 and 14 are secured only at the top of the pouches by fasteners 20, allowing the pouches 12 and 14 to move freely as the sheep moves and which may provide an easy target for the predator.

Figure 4:
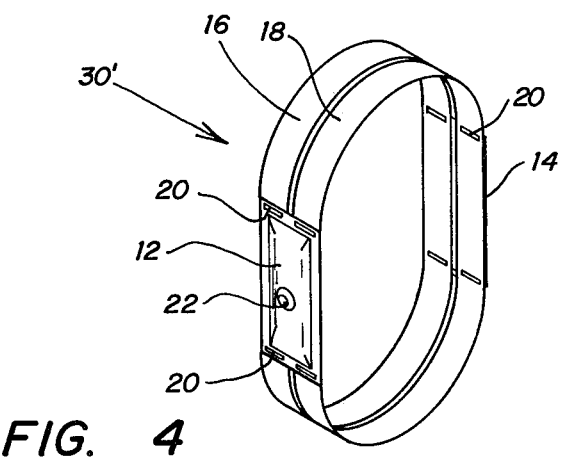
FIG. 4 is a perspective view of an alternate embodiment of the present invention.

FIG. 4 illustrates an alternate embodiment of the present invention in which a toxic control collar 10 has pouches 12 and 14 secured by fasteners 20 at both the top and bottom of the pouch. The alternate embodiment of the predator control collar 10 may be preferable in those regions where the flocks graze in rough undergrowth and brush which might snare or snag the pouches 12 and 14 of the collar 10.

In use, the toxic collar 10 may be formed with elastic members 16 and 18 of a sufficient length to fit around the neck of the young sheep or goat. The preferred time for a rancher to place the collar 10 on his herd of livestock would be at the time of vaccinating young lambs and kid goats, approximately one month after birth. The elastic straps 16 and 18 should have sufficient elasticity to allow the collar 10 to increase with the size of the animal's neck up until the time it is taken to market.

Elastic straps 16 and 18 maintain the predator control pouches 12 and 14 in the region just below the ear of the sheep at all times. Studies of coyote attacks on sheep have indicated that the lower ear region of sheep are frequently punctured by the upper jaws of an attacking predator. The teeth of the predator puncture the pouch 12 or 14 and cause the predicide filled within the pouch to be released. The predator may be repelled by initial release of the predicide or it may continue the attack and receive a lethal dose of the predicide.

Although preferred embodiments of the invention have been illustrated in the accompanying drawings described in the foregoing detailed description, it will be understood that the invention is not limited to the embodiments disclosed, but this case will have numerous rearrangements, modifications, and substitutions of parts and elements without departing from the spirit of the invention.

I claim:

1. A predator control collar for protecting livestock by repelling or killing predators with a predicide, comprising:
    a pair of sealed pouches forming leakproof containers for a predicide, said pouches being rupturable by a predator to release the predicide; and
    a collar supporting said pouches about the neck region of the livestock, said collar including means for expanding in circumference as the neck size of the livestock increases during its growth, whereby the collar may be initially placed upon a young livestock and remain in place to repel or kill a predator until the livestock has fully grown for market.

2. The predator control collar of claim 1, wherein said collar is an elastic strap.

3. The predator control collar of claim 1, wherein said pair of pouches are attached to said collar at two points about the collar such that said pouches are maintained in the general region beneath the ear of the sheep.

4. The predator control collar of claim 1, wherein said pouches are attached only at the top of the collar near the ear of the livestock to allow the pouches to move freely and to present a target to be completely grasped and punctured by the jaws of a predator without grasping the neck of the livestock.

5. The predator control collar of claim 1, wherein said collar include means for expanding first and second sections of said collar between said pouches, whereby said pouches are retained in the same general neck region of the livestock during its growth.

6. The predator control collar of claim 1, wherein said collar includes a pair of elastic spaced apart straps.

7. The predator control collar of claim 1, wherein said collar is a continuous elastic member, whereby the collar may be installed and removed by expanding the collar to fit over the head of the livestock.

8. The predator control collar of claim 1, wherein said pouches are filled with a liquid predicide.

9. The predator control collar of claim 8, wherein said pouches are rubber.

10. The predator control collar of claim 8, wherein said pouches are polyvinyl chloride.

11. The predator control collar of claim 8, wherein said pouches include a fill plug for receiving a needle for injecting the liquid predicide.

12. The predator control collar of claim 1 further comprising:
    a reinforced member attached to the side wall of said pouch opposite said fill plug, said reinforced member preventing the pouch from being punctured completely through by a needle injecting the liquid predicide.

13. A predator control collar for protecting livestock by repelling or killing predators with a predicide, comprising:
    a pair of pouches forming leakproof containers for a liquid predicide, said pouches being rupturable by a predator to release the predicide;
    a fill plug on one wall of said pouches for injecting a liquid predicide into said pouch, including means formed on the wall of each of said pouches opposite said fill plug to prevent the needle from rupturing said pouches; and
    a continuous elastic collar supporting said pouches about the neck region of the livestock, said elastic collar expanding in circumference as the neck region of the livestock increases during its growth.

14. The predator control collar of claim 13, wherein said elastic collar comprises a pair of spaced apart continuous elastic straps for maintaining said pouches in the neck region of the livestock.

15. The predator control collar of claim 13, wherein each section of said elastic collar between said pouches is expandable, whereby said pouches are maintained about the neck region of the livestock as the collar expands.

* * * * *